May 11, 1937.  J. SCHICK  2,080,096
METHOD OF MAKING SHAVING HEADS
Filed June 7, 1934  2 Sheets-Sheet 1
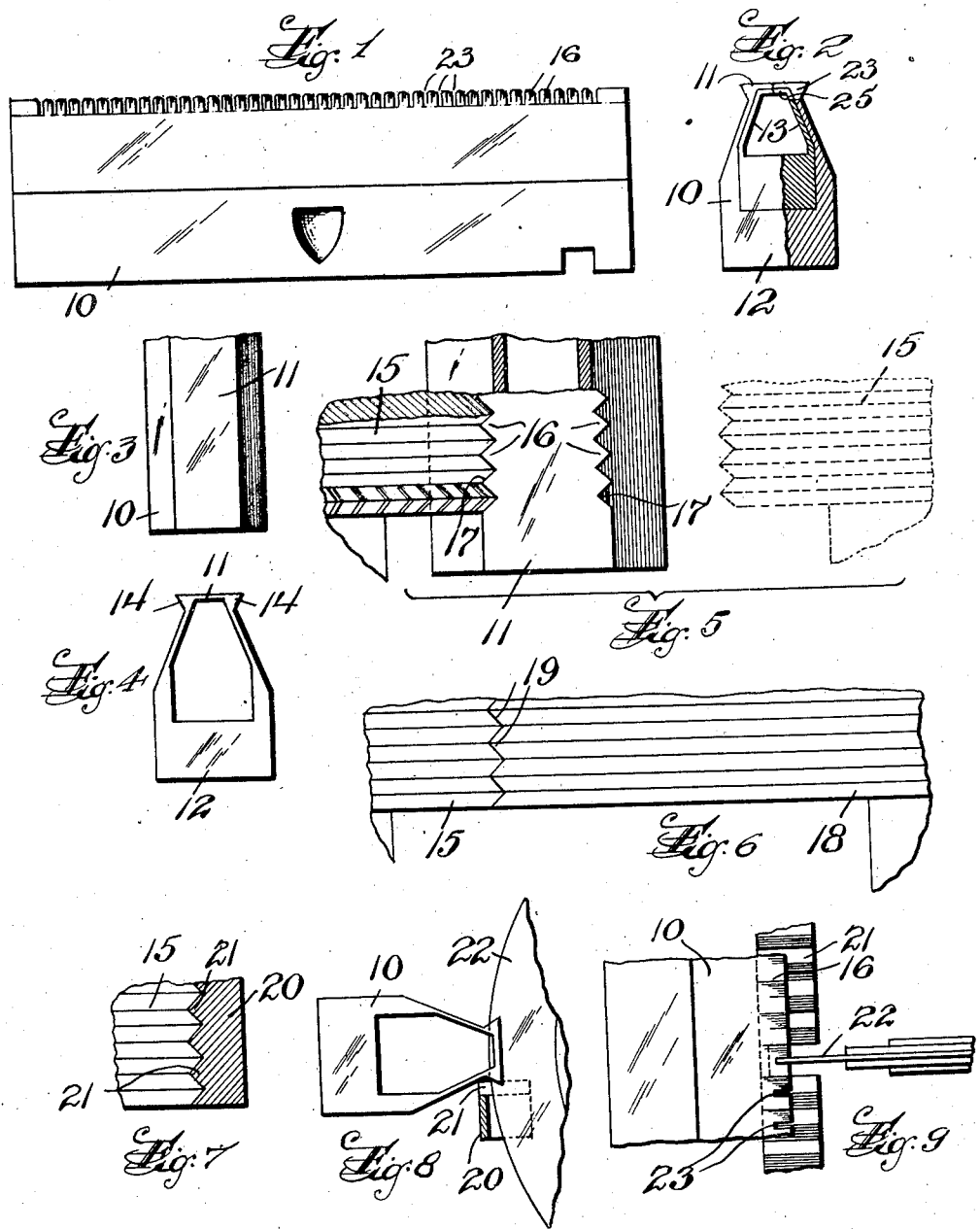
INVENTOR
Jacob Schick,
BY
Wm. H. Caulfield.
ATTORNEY.

May 11, 1937. J. SCHICK 2,080,096
METHOD OF MAKING SHAVING HEADS
Filed June 7, 1934 2 Sheets-Sheet 2
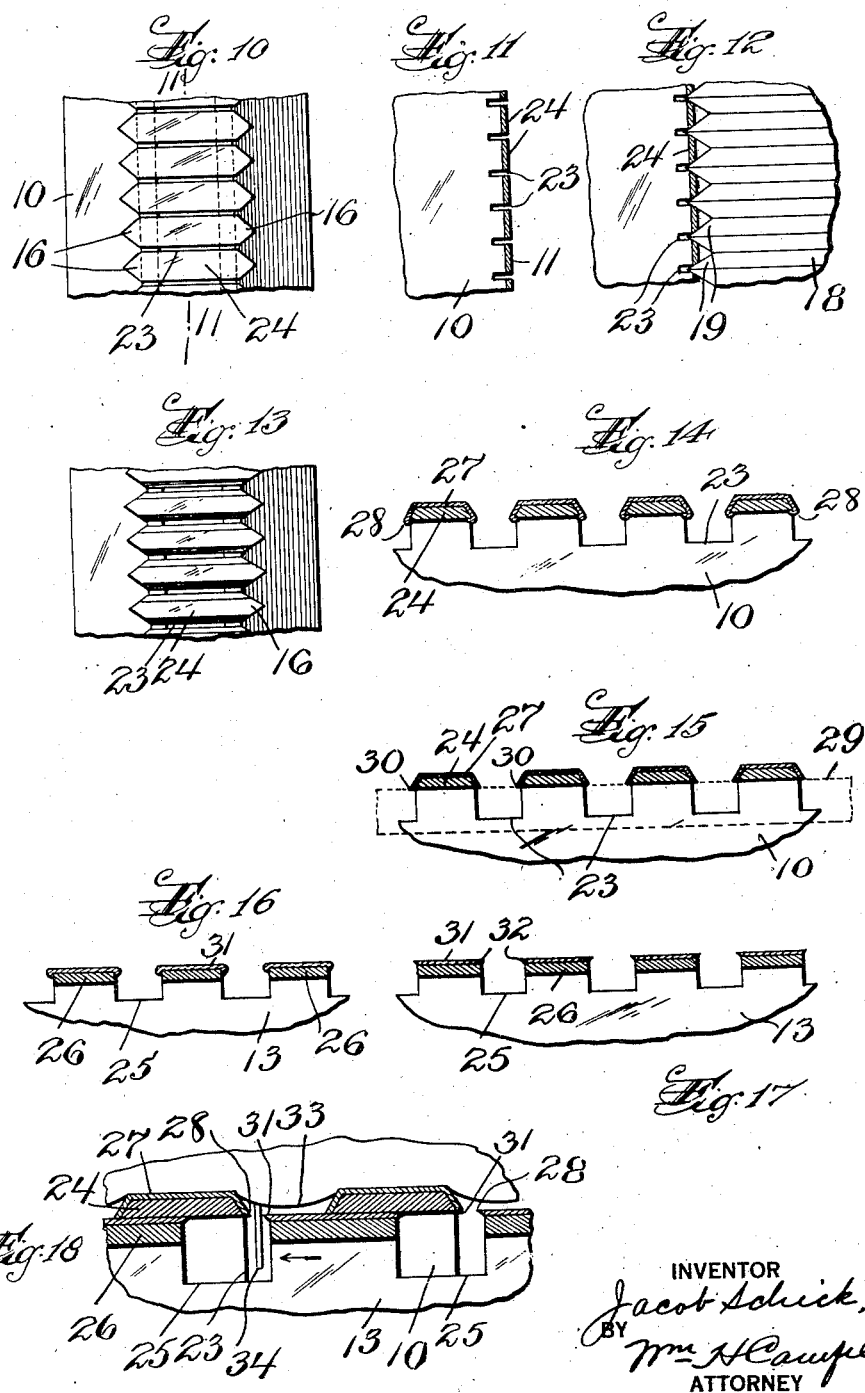

Patented May 11, 1937

2,080,096

UNITED STATES PATENT OFFICE 2,080,096

METHOD OF MAKING SHAVING HEADS

Jacob Schick, Stamford, Conn., assignor, by mesne assignments, to Schick Industries Limited, Nassau, Bahama Islands, a corporation of Bahama Islands Application June 7, 1934, Serial No. 729,439

8 Claims. (Cl. 76—104)

This invention relates to a method of making shaving heads for dry shavers. The shaving heads are of the kind described and illustrated in my Patent No. 1,747,031 issued February 11, 1930. The invention is designed to provide an effective and economical shaving head which is extremely durable.

The shaving heads are used to cut dry hair and in shaving it is also essential that hairs be finely combed to guide them into minute slots on the face of the shearing plate. The relationship of the teeth of the comb and the slots must be accurately determined and precision in the placing of the slots relative to the teeth or points is essential.

Furthermore, the cutters, one operating beneath the other, are both slotted to provide teeth which exercise a nipping or shearing of the hair when the inside cutter is operated. The edges of the slots that do this cutting are necessarily subject to much resistance as the inside cutter reciprocates at a high speed. In view of the difficulty of sharpening the teeth edges must be hard, and as they are very thin, they must be sharp to avoid excess resistance.

The objects of this invention are, to produce a shaving head in which the teeth at the edges and the slots in the face of the shearing plate are properly placed relative to each other, to taper the edges of the slots in an even manner to insure symmetry and uniformity in the opposed edges, to guide the shearing plate in the cutting of the slots and in their milling to insure a head of the slots that will cut equally well along its entire length, and to finish the cutters to provide edges that lap and thus keep sharp edges by such constant lapping. Since these teeth and slots are very small, the teeth at present in commercial use being about 7 one-thousandths thick and the slots being of about the same width as the thickness of the teeth, and as these teeth are tapered to cutting edges, the shearing plate is not adapted for hardening after the slots are cut. It is therefore necessary to cut the slots and sometimes the combs, after the shearing plate has been hardened. This requires a particular process in view of the necessity of accurately arranged slots, each exactly central of the space between aligned comb teeth on opposite side edges of shaving head.

In the drawings, Figure 1 is a side view of a finished shaving head. Figure 2 is an end view of Figure 1 with one-half shown in section. Figure 3 is a top view of part of an outside member before it is provided with comb edges or is slotted. Figure 4 is an end view of the member shown in Figure 3. Figure 5 shows the outside member having its edges cut to form combs. Figure 6 shows the same comb cutter surfacing a lapping wheel used in a later step. Figure 7 shows the same cutter forming an index plate to be used in a later step. Figure 8 is an end view of the outer member being slotted with the index acting as a guide. Figure 9 is a top view of the parts shown in Figure 8. Figure 10 is a top view of the outer member after the slotting is done as shown in Figures 8 and 9. Figure 11 is a detail section of the shear plate of the outer member on line 11—11 in Figure 10. Figure 12 shows the outer member as of Figures 10 and 11 being subjected to a taper lapping to form tapered slots by means of the lapping wheel shown as being formed in Figure 5. Figure 13 is a top view of the outer member shown in Figure 12, that is, with tapered member shown in Figure 12, that is, with tapered slots compared to the straight-walled slots of Figure 10. Figure 14 is an enlarged detail section of the outer member with the shear plate plated and Figure 15 shows the plated shear plate after it is lapped. Figure 16 shows the inside member after plating and Figure 17 shows the plated inside member after lapping. Figure 18 is an enlarged section showing the finished inside and outer members assembled and illustrating the device applied to the skin to cause a hair to be severed.

In the dry shaving of hair from the skin it is essential that the hair be guided into slots in which they are held erect for cutting and also that any curled hair be combed and guided into the slots when the shaving head is moved across the surface of the skin. The walls of the slots are tapered in order that the skin may cushion into the slots and allow a closer shave.

In order to bring about the precision necessary in locating the minute slots and to provide a proper cutting edge on the fine teeth I use the cutters that form the comb at the edges of the shaving head for also forming the member that laps the taper on the teeth and also to form the index plate that guides the outer member when the slots are cut in its face to form the teeth.

The shaving head comprises an outer member 10 which has a shearing plate 11 on the face where it engages the skin. The outer member also has a base 12. The outer member is therefore tubular. Inside the outer member is an inside member 13 which has an outside contour to fit the inside of the outer member. The inside member is also hollow. This is preferable as it allows the escape of cut hair and allures such hairs as do not fall out to be blown out or removed by means of a pipe cleaner or the like.

The inside member is reciprocated rapidly in a longitudinal direction—and teeth, forming small blades on both cutters, act to cut the hairs that enter the slots between the teeth. The method of locating and forming the teeth is the subject-matter of this invention.

The preliminary steps of forming the members themselves are not described herein and the outside members are first shown in Figures 3 and 4 having the flat shear plate 11 at the top and the milled sides to form the overhanging side edges 14. One overhanging edge 14 is cut by a cutter 15 which cuts teeth 16 having pointed ends 17. Both edges 14 are cut with the pointed ends of one set of teeth accurately placed opposite those on the other side. This is usually done in any machine that can move the cutters or the member accurately on a bed and I show the second cutter in dotted outline in Figure 5 and the teeth 16 that have been formed by it on the right hand edge of the member 10. The parts are much enlarged and only a part of one end of the member and of the cutters is shown.

One of the cutters 15 is used to cut a lapping member 18 as in Figure 6, usually a wheel, which has its periphery formed with a toothed or comb-like lapping face exactly spaced to fit the teeth 16. The lapping thus is supplied with the teeth 19. This lapping member is to be used later. The cutter 15 is also used as in Figure 7 to form teeth in a guide plate 20 having teeth 21 which are the same as the teeth 16 in the member 10. This index plate is used in the making of the slots in the shear plate 11.

The shear plate is now slotted to form the article shown in Figure 10. This is done by cutting slots successively by a thin slotting wheel 22, see Figures 8 and 9, and deep enough to extend below the overhanging teeth 16. The index plate 20 is mounted adjacent the slotting disc 22 and is fixed in position as is the rotating wheel 22. The member 10 is manually guided, usually by a clamp on handle which holds the member 10, and is seated on the index plate as shown in Figures 8 and 9, and then pressed against the disc 22 until the slot is cut the proper depth. While this slotting takes place the teeth 16 of the comb slide in the teeth 21 of the index-plate 20. When a slot is completed the member 10 is withdrawn, moved over the width of one tooth and the next slot is cut. This is repeated until all the slots are cut. This method insures each slot being located exactly at the base between two teeth and as the teeth in the other edge are exactly opposite, the slot is located in the same way relative to this other edge. The teeth of the index-plate and the member co-operate to position and guide the member in the slotting operation and it makes no difference which edge of the member is used for guiding the member on the index plate. The article is now shaped as shown in Figures 10 and 11, having the slots 23 extending from side to side between the bases of the teeth 16.

The next step is the tapering of the walls of the slots which also tapers the edges of the blades 24 formed when the slots 23 were cut across the shearing plate 11. The tapering is done by the lapping member 18 which has its lapping surface as shown in Figure 6. The spacing of the lapping teeth is, of course, the same as that of the article to be operated on as they were formed by the same cutter 15. The shaving head is held by hand or suitable means against the lapping member 18 as shown in Figure 12. This step of taper lapping forms the teeth as shown in Figure 13. The tapered walls are balanced, that is, the slots are of the same width and the blades are of equal width with one another and this is necessary as the various slots must permit the human skin to cushion into all the slots to the same extent to produce an even and smooth shave.

The steps described in detail herein are performed on a hardened article having an extremely thin shearing plate. This is necessary because tests show that a soft metal article so formed is distorted and ruined when hardening is done after the slotting. The blades are usually made seven one-thousandths of an inch thick and are separated by slots of about the same dimension in width. The inside member 13 is slotted, as at 25 to form thin teeth 26 extending across the member under the shearing plate. When the inside member is translated across the outer member of the shearing head their edges will sever any hairs in the slots 23. A spring is placed between the bases of the members to give the yielding pressure necessary to easy shaving and keep the shearing parts in contact. This part of the cutter is not shown as it forms no part of this invention.

The member 10 is now plated on the toothed part with a hard metal, preferably chromium. The plating is done on the outer and side edges of the teeth as at 27 and extends in the form of burrs at 28 to the inside edge of the teeth 24. This is then lapped by a lapping bar 29 on the inside forces of the teeth 24 but forms a sharp tapered cutting edge 30 at the edges of the blades 24. With such a metal as chromium this provides a very hard cutting or nipping edge.

The inside cutter may be similarly plated on the outer faces of the teeth 26 as at 31 and then this is lapped to form the tapered edges 32 as the plating extends over the side edges of the teeth 26.

The assembly of these parts, shown much enlarged in Figure 18 brings the cutting edges 30 and 32 opposed to each other. The skin cushions into the slots as at 33 and enables the hair 34 to be cut off close to the skin. The movable cutter does not engage the skin to irritate the skin. The thin plated surfaces are kept sharp by the lapping they undergo in operation and need no sharpening as the hair is cut dry and as it is brittle when dry it is easily severed even before the cutters completely pass through it.

This shaving head when made by this process is accurate also in the centralizing of the slots 23 between the teeth 16. The teeth pick up any curled or soft hairs as the shaving head is passed along the skin and directs them into the slots 23 where they are cut off. The hair shown in Figure 18 is reduced in size compared to the other parts, as in practice, the slots are about wide enough to receive one hair.

The shaving heads made by this method have been commercially used long enough to prove that they require no sharpening after use and are efficient in dry shaving, not only on short bristly hair but on fine and soft hair.

I claim:

1. A method of making shaving heads which consists in forming a thin shearing plate with overhanging edges, forming teeth on the said edges of the plate, slotting the plate transversely between the bases of the teeth and then tapering the side walls of the slots, the said slotting and tapering being accomplished while using the teeth as guiding means whereby the finished tapered slots are located with precision relative to the teeth.

2. A method of making shaving heads which comprises the forming of the outer member of a shaving head of hardened metal with a flat shearing plate and overhanging edges, forming teeth on the overhanging edges said teeth being accurately aligned on the opposite sides, forming slots in the shearing plate between the bases of the teeth to form blades, tapering the walls of the slots, the said slotting and tapering being accomplished while using the teeth as guiding means whereby the finished tapered slots are located with precision relative to the teeth, plating the walls of the slots, and then lapping the inside faces of the blades and the plating to form cutting edges.

3. A method of making shaving heads which comprises the forming of the outer member of a shaving head of hardened metal with a flat shearing plate and overhanging edges, forming teeth on the overhanging edges said teeth being accurately aligned on the opposite sides, forming slots in the shearing plate between the bases of the teeth to form blades, tapering the walls of the slots, plating the walls of the slots, and then lapping the inside faces of the blades and the plating to form cutting edges, forming an inside member with a slotted face, plating the cutter at the slots, and then lapping the plated surface of the inside member to form cutting edges to oppose the lapped edges of the blades of the outer member.

4. A method of making shaving heads which comprises the shaping of an outer member with a shearing plate and overhanging side edges, cutting teeth in aligned positions on the opposite overhanging edges, cutting slots in the shearing head while guiding the teeth of the shaving head on the teeth of an index plate, the teeth on the index plate being similar to aforesaid teeth on the overhanging edges, and then tapering the walls of the slots by a member having teeth similar to the aforesaid teeth formed on the overhanging edges to form tapered blades.

5. A method of making shaving heads which comprises the shaping of an outer member with a shearing plate and overhanging side edges, cutting teeth in aligned positions on the opposite overhanging edges, cutting slots successively in the shearing head while guiding the teeth of the shaving head on similar teeth of an index plate, and then tapering the walls of the slots by means of a lapping member with similar teeth to form tapered blades, then plating the blades including the tapered walls, and then lapping the bottom face of the blades and the plating to form cutting edges.

6. A method of making shaving heads which comprises the forming of the outer member of a shaving head of hardened metal, with a flat shearing plate and overhanging edges, forming teeth on the overhanging edges, cutting slots between the bases of the teeth to form blades, and tapering the walls of the slots, the teeth of the overhanging edges being utilized as guides in the slotting and tapering operations.

7. A method of making shaving heads comprising the forming of an outer member with a face-engaging surface and an overhanging edge, forming tapered teeth on said edge, slotting the surface at the bases of the teeth while guiding the shaving head on an index plate with teeth similar to the teeth of said edge, whereby the slots are located with precision relative to the teeth on the overhanging edge.

8. A method of making shaving heads comprising the forming of an outer member with a face-engaging surface and an overhanging edge, forming tapered teeth on said edge, slotting the surface at the bases of the teeth while guiding the shaving head on an index plate with teeth similar to the teeth of said edge, whereby the slots are located with precision relative to the teeth on the overhanging edge, and the lapping of the edges of the slots by a member having teeth similar to the teeth of the overhanging edge.

JACOB SCHICK.